US006809047B2

(12) United States Patent
Lebold et al.

(10) Patent No.: US 6,809,047 B2
(45) Date of Patent: Oct. 26, 2004

(54) COMPOSITE NON-WOVEN INK ABSORBER

(75) Inventors: Alan Lebold, Niagra Falls, NY (US); Thomas Sass, West Seneca, NY (US)

(73) Assignee: BMP America, Inc., Medina, NY (US)

( * ) Notice: Subject to any disclaimer, the term of this patent is extended or adjusted under 35 U.S.C. 154(b) by 66 days.

(21) Appl. No.: 10/133,393

(22) Filed: Apr. 29, 2002

(65) Prior Publication Data

US 2003/0202061 A1 Oct. 30, 2003

(51) Int. Cl.$^7$ ............................ B32B 27/02; B32B 5/26

(52) U.S. Cl. ........................ 442/392; 442/402; 442/407; 347/31; 347/35; 347/36

(58) Field of Search ................................ 442/392, 402, 442/407, 327, 381; 347/31, 35, 36, 86; 428/212, 218, 220

(56) References Cited

U.S. PATENT DOCUMENTS 4,377,615 A * 3/1983 Suzuki et al. ............... 428/213
4,463,359 A 7/1984 Ayata et al.
5,157,421 A * 10/1992 Kitahara ................. 346/140 R
5,380,582 A * 1/1995 Neely, Jr. et al. ........... 428/220
5,420,625 A 5/1995 Dietl et al.
5,466,513 A * 11/1995 Wanek et al. ............... 428/218
5,470,640 A * 11/1995 Modrak ...................... 428/171
5,607,798 A * 3/1997 Kobylivker et al. ......... 442/381
5,891,547 A * 4/1999 Lawless ....................... 428/92
5,942,452 A * 8/1999 Daponte et al. ............ 442/382
6,066,388 A * 5/2000 Van Kerrebrouck ........ 428/218
6,137,515 A 10/2000 Dickinson
6,168,849 B1 * 1/2001 Braverman et al. ......... 428/137
6,334,674 B1 * 1/2002 Ono et al. ..................... 347/86
6,481,827 B2 * 11/2002 Yearout ....................... 347/36
6,503,855 B1 * 1/2003 Menzies et al. ............ 442/328
6,521,555 B1 * 2/2003 Bodaghi et al. ............ 442/400
2001/0036788 A1 * 11/2001 Sandoe et al. .............. 442/389

* cited by examiner

*Primary Examiner*—B. Shewareged
(74) *Attorney, Agent, or Firm*—Jones Tullar & Cooper, PC

(57) ABSTRACT

A composite non-woven needlefelt ink absorber that is particularly suited for use with an ink jet printer to absorb and disperse waste ink utilizes at least two distinct layers. The layer initially contacted by the ink is low density/course denier. The final ink receiving and retaining layer is high density/fine denier. Any intermediate layers are also intermediate in density and denier.

30 Claims, 8 Drawing Sheets

COMPOSITE NON-WOVEN INK ABSORBER

FIELD OF THE INVENTION

The present invention is directed generally to an ink absorber for use primarily in an ink jet printer. More particularly, the present invention is directed to a composite non-woven material for use as an ink-absorber in an ink jet printer. More specifically, the present invention is directed to a composite non-woven needlefelt for use as an ink absorber in an ink jet printer. The composite non-woven ink absorber has a low density/coarse denier top layer and a high density/fine denier bottom layer wherein denier is understood to be the weight-per-unit-length measure of the fiber. The composite non-woven ink absorber of the present invention provides for uniform and efficient absorption and transportation of ink from the top surface of the top layer to the body of the bottom layer of the composite non-woven material.

DESCRIPTION OF PRIOR ART

In ink jet printing devices, the print head typically includes one or more ink filled channels, each with a relatively small ink supply chamber at one end and having an opening, referred to as a nozzle, at the opposite end. Ink droplets are formed and are discharged onto a substrate to be printed. To prevent the nozzles from becoming clogged with dried residual ink droplets, the nozzles are thoroughly flushed with additional ink jet droplets after use. Alternatively, a vacuum may be created within the nozzles, which removes all residual ink prior to any further printing operations. The waste ink generated by either the flushing or vacuuming procedure is discharged to a waste ink absorber where it is subsequently stored for the duration of the service life of the ink jet printer.

Another consideration is the use of "full bleed" ink jet photographic quality printing. An overshoot of ink droplets from a print head can intentionally be made to fill the print sheet from edge-to-edge. The print sheet would not be adhered to a base sheet but would be independently fed through the ink jet printer. The overshoot of ink droplets in the "full bleed" process would be dispersed to a waste ink absorber where it is subsequently stored or transferred to a final waste ink reservoir for the duration of the service life of the ink jet printer.

In both cases, the collection of ink is not always uniform. Ink accumulates on the surface of the waste ink absorber device. It dries into a gel state that consequently clogs the waste ink absorber. The clogged waste ink absorber does not allow for efficient and uniform dispersal of waste ink into the body of the waste ink absorber. This results in an insufficient capacity for waste ink storage with respect to the life of the ink jet printer.

Nozzles can become contaminated or even clogged by contact with the waste ink. The print sheet can have unwanted ink spots on its non-printed backside. In either case, the quality of print is greatly reduced because of the accumulation of the ink in the waste ink absorber.

There is a need for a waste ink absorber that will eliminate waste ink clogging in the waste ink absorber and which will also allow for a sufficient amount of waste ink storage corresponding to the service life of an ink jet printer. The composite non-woven ink absorber, in accordance with the present invention, overcomes the limitations of the prior art. It is a substantial advance in the art.

SUMMARY OF THE INVENTION

It is an object of the present invention to provide an ink jet absorber for use primarily in an ink jet printer.

Another object of the present invention is to provide a non-woven ink jet absorber.

A further object of the present invention is to provide a composite non-woven needlefelt for use as an ink jet absorber.

Yet a further object of the present invention is to provide an ink jet absorber that accomplishes the uniform and efficient absorption and transport of ink from a top surface of the composite non-woven material to the body of the composite non-woven material.

The ink jet absorber in accordance with the present invention utilizes a composite non-woven material, such as a composite non-woven needlefelt, having a low density/coarse denier top layer and at least one higher density/finer denier lower or bottom layer. The denier is understood to be the weight-per-unit-length of the fiber used to form the non-woven needlefelt. The ink jet absorber is intended primarily for use with ink jet printers, and will be discussed hereinafter in that context. It is to be understood that the ink jet absorber of the present invention is susceptible of other uses.

The ink jet absorber quickly absorbs waste ink discharged from ink jet nozzles and, through the inherent capillary gradient between layers in the composite non-woven material, disperses or transports the waste ink evenly from the surface of the top layer through to the bottom layer of the ink jet absorber. Typically, waste ink from ink jet nozzles is dropped onto the ink jet absorber at a specific point on the surface of the top layer. The ink jet absorber of the present invention will quickly disperse waste ink vertically through its top layer and will then subsequently disperse the waste ink evenly horizontally through the bottom layer of the ink jet absorber.

One important characteristic of the present invention is the provision of a capillary gradient between the top and bottom layers of the composite non-woven material. The capillary gradient is accomplished by constructing a composite non-woven material, such as a composite non-woven needlefelt, in the subject ink jet absorber, with a minimum of two layers having differing capillary forces between these layers. The capillary force of each layer is selected in accordance with the requirements of the specific application. The ink jet absorber of the present invention has a top layer consisting of a low density/coarse denier composition and at least a high density/fine denier composition bottom layer.

Capillary force in a non-woven material is a function of the surface tension of ink with respect to fiber type, contact angle of ink on the fiber and the fiber surface area per unit volume of the non-woven material, such as needlefelt. Capillary force in a non-woven material can be considered as being analogous to capillary head in a vertical capillary tube. The space between the fibers in the non-woven material can be approximated as a vertical capillary tube. The equation for force in a vertical capillary tube is given as follows:

$F = 2\pi r \sigma_{LV} \cos \theta_{LS}$ where,

F=Capillary Force r=Tube Radius $\sigma_{LV}$=Surface Tension $\theta_{LS}$=Contact Angle The fiber surface area per unit volume of the non-woven material is a function of the non-woven material's density and fiber size. The equation for fiber surface area per unit volume of the non-woven material is given as follows:

$$SA = \left(\frac{4}{d_f}\right)\left(\frac{\rho}{\rho_f}\right)$$

where,

SA=fiber surface area per unit volume $d_f$=diameter of fiber

ρ=density of non-woven needlefelt $\rho_f$=density of fiber

A higher SA or surface area will create many individual capillary tubes within the non-woven material, such as a needlefelt, thus creating a high capillary force, F, in the non-woven needlefelt. A low density/coarse denier layer will have a low fiber SA or surface area per unit volume of felt compared to a high density/fine denier layer. The ink jet absorber of the present invention has a top layer consisting of a low density/coarse denier composition and at least a bottom layer consisting of a high density/fine denier composition. The top layer can be considered as having a high permeability, or "open" structure, while the bottom layer can be considered as a having a low permeability with a high capillary force particularly in the horizontal direction. High permeability is understood to mean a low fiber surface area to unit volume structure and low permeability is understood to mean a high fiber surface area to unit volume structure.

The "open" structure of the top layer of the composite non-woven needlefelt or similar material ink absorber of the present invention allows the waste ink from ink jet nozzles to quickly move vertically or to be transported from the top surface of the low density/coarse denier composition top layer through to the high density/fine denier composition bottom layer. Since the dwell time of the waste ink is minimized at the top surface of the top layer of the ink absorber, and ink absorption is uniform in the bottom layer, the possibility of ink build-up at the top surface of the top layer is minimized. Ink build-up can cause clogging of the ink jet absorber and unwanted contact between the built-up ink and ink jet printer nozzles.

The construction of the composite non-woven material is such that the fibers of the top layer and bottom layers are physically in contact. In one embodiment they may be interlocked by the action of, for example, a needle loom. Preferably, the fiber interlock will be unidirectional with fibers residing in the top layer being driven into and interlocked with fibers in the bottom layer. The attachment of each layer in this type of construction utilizes well-established interlocking techniques and therefore is economical. This contributes to an overall reduction in manufacturing costs.

While a needlefelt induced fiber interlock is particularly suited for use in forming the composite non-woven ink absorber in accordance with the present invention, other connections between the layers of the non-woven material are also within the scope of the present invention. The non-woven layers could be laminated and secured by a pressure sensitive adhesive strip bond. Alternatively, a dot style pressure sensitive adhesive bond could also be utilized. A thin, highly permeable layer of a low melt polyester non-woven fiber could be used to secure the layers. The layers could also be unsecured but placed in physical contact. Each one of the non-woven fiber layers is also preferably formed as a needlefelt material, as that term is understood in the art. It is to be understood that other materials, typically other non-woven materials which are not needlefelt materials, and also other materials, which may not be non-woven materials are also useable in the present invention. The term needlefelt will be used subsequently but will be understood as encompassing these other arrangements.

The composite non-woven needlefelt for use as a waste ink absorber in accordance with the present invention is to be used in a unidirectional manner in which the waste ink from ink jet nozzles enters the top surface of the top layer. If necessary, the unidirectional configuration of this composite non-woven needlefelt is accomplished by distinctly defining the differentiation of layers via fiber color selections. The distinction between the top and bottom layers via fiber color selection eliminates the need for critical fit and function inspection. This contributes to an overall reduction in manufacturing cost.

The composite non-woven ink absorber in accordance with the present invention provides an effective, efficient device for absorbing and holding waste ink in an ink jet printer. It is a substantial improvement over the prior art devices and is a significant advance in the art.

BRIEF DESCRIPTION OF THE DRAWINGS

While the novel features of the composite non-woven needlefelt for use as an ink jet absorber in accordance with the present invention are set forth with particularity in the appended claims, a full and complete understanding of the invention may be had by referring to the detailed description of the preferred embodiments, as presented subsequently, and as illustrated in the accompanying drawings in which:

DETAILED DESCRIPTION OF THE PREFERRED EMBODIMENTS

Figure 1:
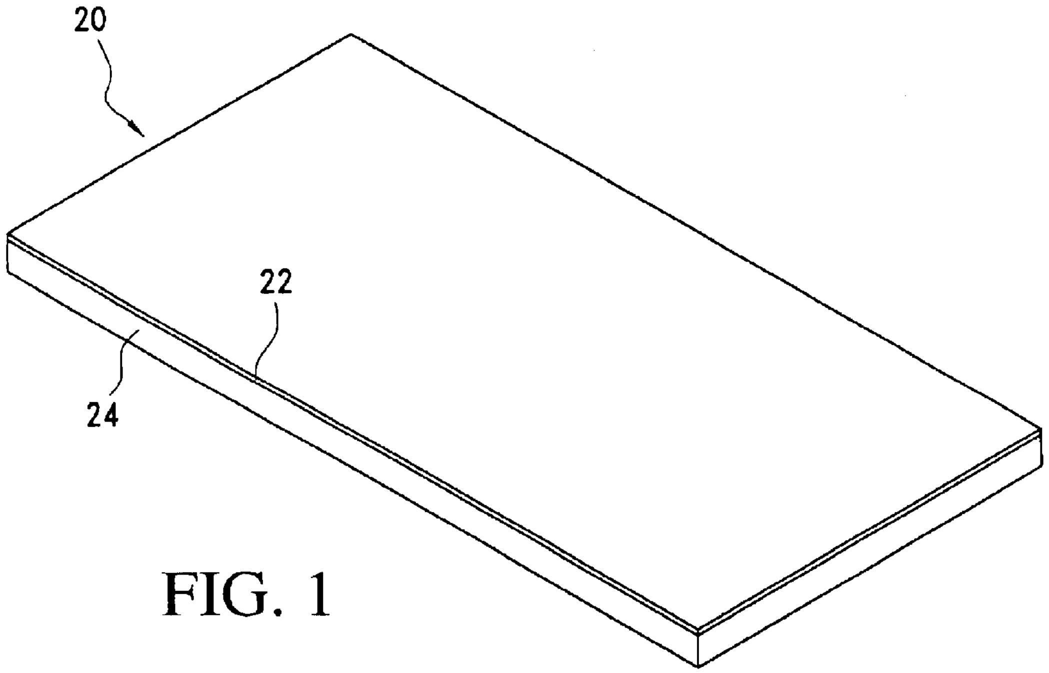
FIG. 1 is a schematic perspective view of a first preferred embodiment of a composite non-woven needlefelt useable as an ink jet absorber in accordance with the present invention.
Figure 2:
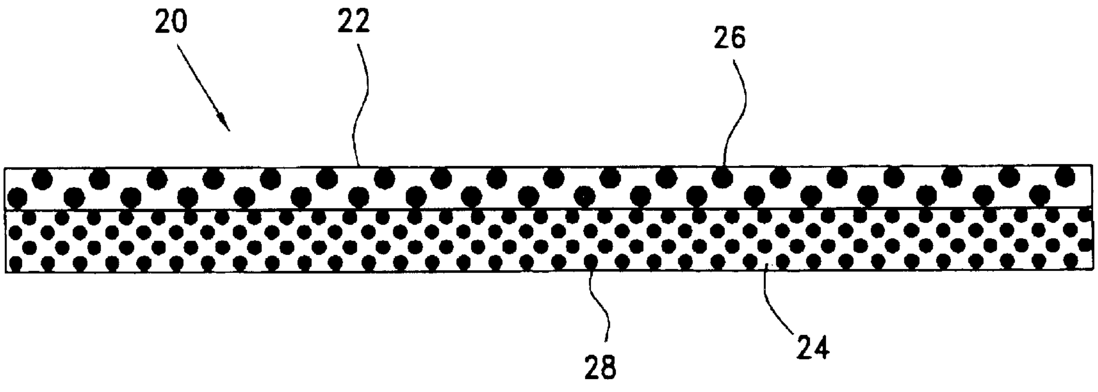
FIG. 2 is a cross-sectional view of the composite non-woven needlefelt ink jet absorber depicted in FIG. 1.

Referring initially to FIG. 1, there may be seen generally at 20, a first preferred embodiment of a composite non-woven needlefelt for use as an ink jet absorber device in accordance with the present invention. In this first preferred embodiment, a top layer 22 and a bottom layer 24 form the composite non-woven needlefelt 20. Top layer 22 has a low density/coarse denier fiber construction and the bottom layer 24 has a high density/fine denier fiber construction. As discussed above, each of the two layers 22 and 24 is preferably a non-woven needlefelt. The composite non-woven ink absorber 20 is also preferably a needlefelt. However, each of the two layers could be a material which is not a needlefelt and does not have to be non-woven. The composite can also be formed by other than needlefelting. FIG. 2 is a cross-sectional view of the first preferred composite non-woven needlefelt 20 depicted in FIG. 1. Coarse fibers 26 of top layer 22 and fine fibers 28 of bottom layer 24 are depicted as large circles and small circles, respectively. The relatively low number of coarse fibers 26 and the relatively high number of fine fibers 28 represent low and high-density compositions respectively. The specific compositions and sizes of the coarse fibers 26 and of the fine fibers 28 are set forth subsequently in conjunction with several of the preferred examples. The composite material is preferably a non-woven needlefelt as those terms are understood by one of skill in the art. Typically, non-woven felts are formed by the extrusion of a plurality of strings or strands from a tip plate or a bushing onto a forming surface. The strands in each non-woven material are typically connected by a needling step. The two layers are then joined to each other by a further needling operation, as referenced previously, in which needles are inserted into, and then withdrawn from the composite material. The needling operation entwines the fibers at the juncture of the two felts and results in the composite non-woven needlefelt that is useable with the present invention.

Figure 3:
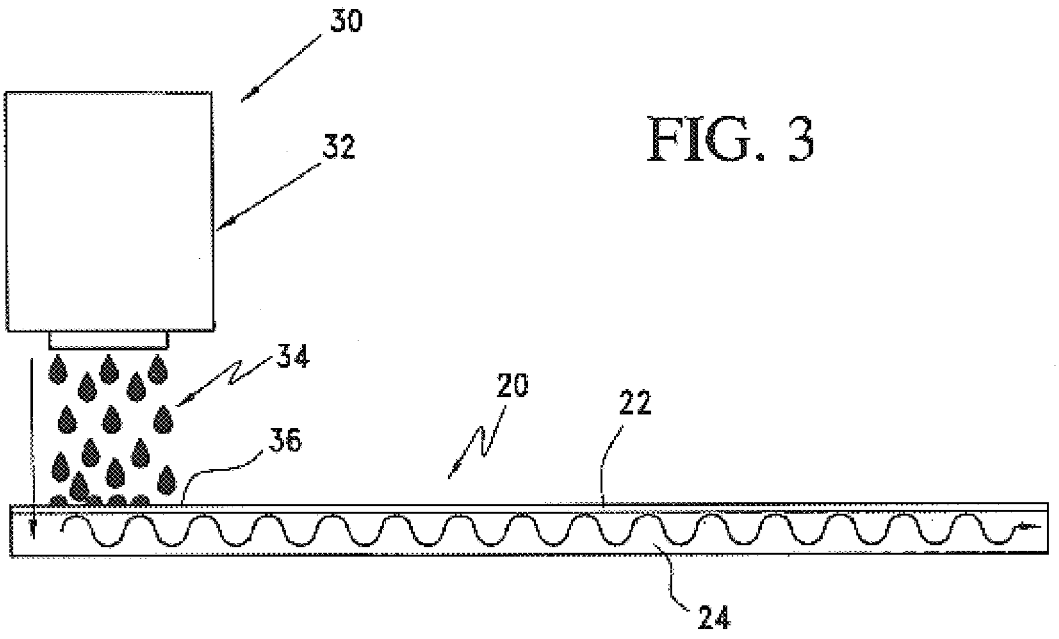
FIG. 3 is a schematic side elevation view of an ink jet cartridge with ink dispensing nozzles working with the composite non-woven needlefelt ink jet absorber of the present invention.

Turning now to FIG. 3, there is schematically depicted an ink jet printer, generally at 30, that can utilize the ink jet absorber, generally at 20, of the present invention. The ink jet printer 30 includes an ink jet printer cartridge 32. This printer cartridge 32, during its cleaning operation, will product droplets 34 of waste ink. These waste ink droplets 34 are typically dropped onto ink jet absorber 20 at a specific point on a surface 36 of top layer 22 of the ink jet absorber 20, as shown in FIG. 3. In accordance with the present invention, the ink jet absorber 20 will disperse the waste ink droplet 34 vertically through top layer 22 and will horizontally disperse the waste ink droplet 34 throughout the bottom layer 24 of the ink jet absorber 20. This dispersion of the waste ink droplets 34 through the top layer 22 is due to the low density/coarse denier fiber used in the top layer 22, and the high density/fine denier bottom layer 24 used to form the ink jet absorber 20 of the present invention. The low density/coarse denier fibers used to form the top layer 22 have a low fiber surface area per unit volume of felt. The top layer has a highly permeable structure that allows the waste ink 34 to pass through it. The lower layer 24, which is of high density/fine denier fibers, has a higher fiber surface area per unit volume of felt. This provides a higher capillary force and results in the horizontal movement or transport of the waste ink particles or drops 34 out away from a location directly beneath their point of contact with the upper layer 22 of the ink jet absorber 20. The result of this composite structure is initial retention of the ink droplets that fall into the upper, less dense layer 22 and the efficient, effective dispersal of the ink as it passes into the lower, more dense layer 24 of the ink jet absorber 20.

Figure 4A:
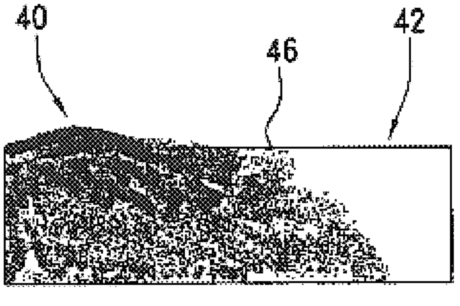
FIG. 4A is a cross-sectional depiction of ink distribution of a typical non-composite ink jet absorber.
Figure 4B:
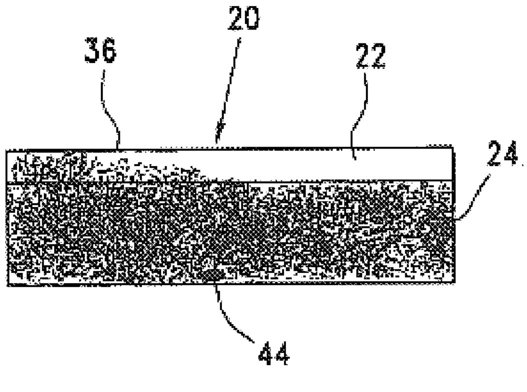
FIG. 4B is a cross-sectional depiction of ink distribution in the composite non-woven needlefelt ink jet absorber in accordance with the present invention.

In FIG. 4A there is depicted schematically a typical ink distribution pattern, generally at 40 which is apt to result when using a prior art, typical non-composite ink jet absorber 42. In such a prior art non-composite ink jet absorber, the ink that is directed to the absorber tends to remain on its surface and does not become dispersed both vertically and horizontally. This can be seen by referring to FIG. 4A. In substantial contrast, as seen in FIG. 4B, the use of the composite non-woven needlefelt ink jet absorber 20 of the present invention provides a much more effective ink dispersal or ink distribution profile. This is depicted schematically at 44. The composite non-woven needlefelt 20 allows the waste ink droplet 34 from ink jet printer cartridge 32 to quickly spread from the top surface 36 of the top layer 22 through to the bottom layer. Since the dwell time is minimized at the top surface 36 of the top layer 22, the resultant uniform ink distribution 44 in the bottom layer significantly reduces the possibility of ink build-up at top surface 36 of top layer 22. A typical prior art non-composite ink jet absorber device 42 results in a longer respective dwell time in top layer 46 and thus the depicted ink distribution 40 results. Ink distribution 40 can cause clogging of this prior art, non-composite ink jet absorber 42 and this may result in unwanted contact between ink distribution 40 and ink jet printer cartridge 32. Another consequence is unwanted contact between ink build-up at top surface 46 of the non-composite ink jet absorber 40 and the printed medium. These previously occurring problems are very effectively remedied by use of the composite non-woven needlefelt ink jet absorber 20 of the present invention. As seen in FIG. 4B, there is no build-up of waste ink on the top 36 of the top layer 22. The waste ink passes through the top layer 22 and disperses into the bottom or lower layer 24. The ink distribution pattern 44 makes much more efficient use of all of the ink jet absorber 20 and results in a device which will have a life sufficient to last as long as the ink jet printer.

EXAMPLES

Example #1

A composite non-woven needlefelt 50 was produced for use as an ink jet absorber device in an ink jet printer application. This first composite non-woven needlefelt 50 included two distinct layers 52 and 54, as depicted schematically in FIG. 5. The top layer 52 consisted of black colored, polyester staple fibers with an overall, generally coarse denier of 3.0 and an overall low density of 0.20 grams per cubic centimeter. The bottom layer 54 consisted of a white colored, polyester staple fiber blend with a generally fine denier of 75-percent 1.50 denier fibers and 25-percent 2.25 denier with a relatively high density of 0.31 grams per cubic centimeter. The overall felt density of the first composite non-woven needlefelt was 0.27 grams per cubic centimeters. Overall nominal thickness of the first example composite non-woven needlefelt was 3.25 mm.

Figure 5:
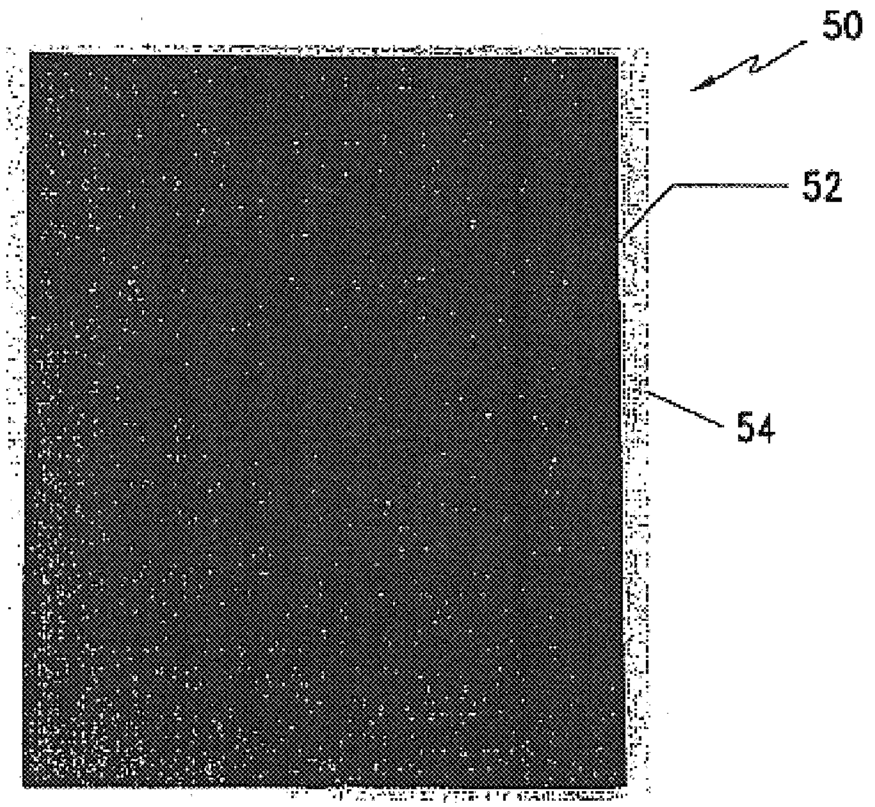
FIG. 5 is a photograph of a first preferred embodiment of a composite non-woven needlefelt ink jet absorber in accordance with the present invention.
Figure 6:
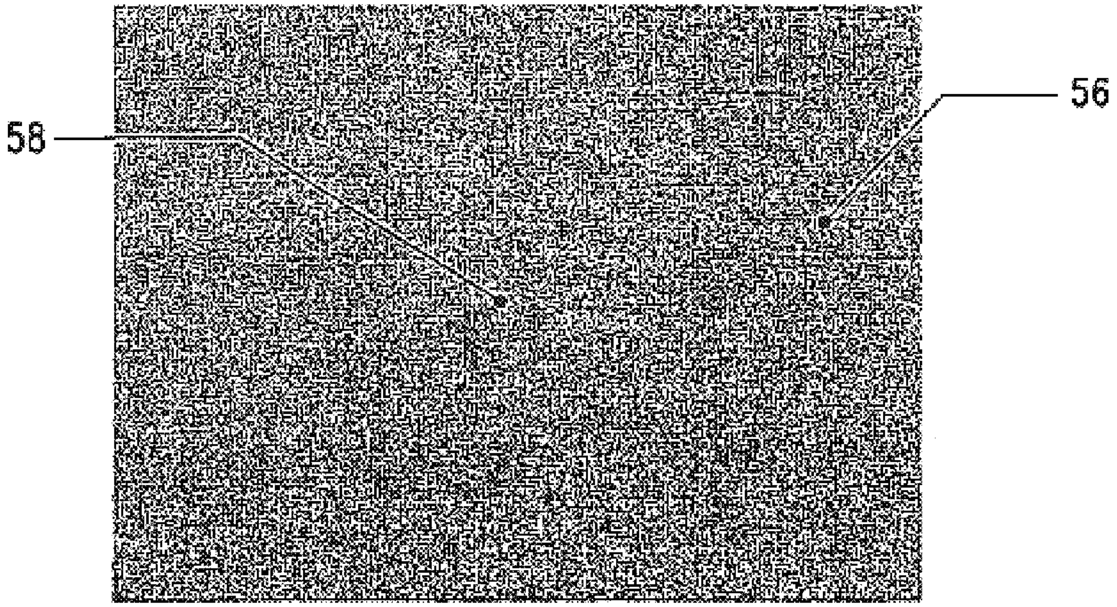
FIG. 6 is a photograph of an ink impression taken from a top surface of the composite non-woven needlefelt ink jet absorber of FIG. 6.

This composite non-woven needlefelt 50 was then cut to a rectangular shape of 203 mm×254 mm. A quantity of 25 ml of ink was dispersed into the composite non-woven needlefelt 50. A piece of kraft paper 56 was placed against a top surface of top layer 52 and was held down with a 2175 gram laboratory weight at 10 seconds after ink dispersion. FIG. 5 shows the composite non-woven needlefelt 50 immediately after ink dispersion. FIG. 6 shows the ink impression 58 on the kraft paper 56 after 10 seconds.

Figure 7:
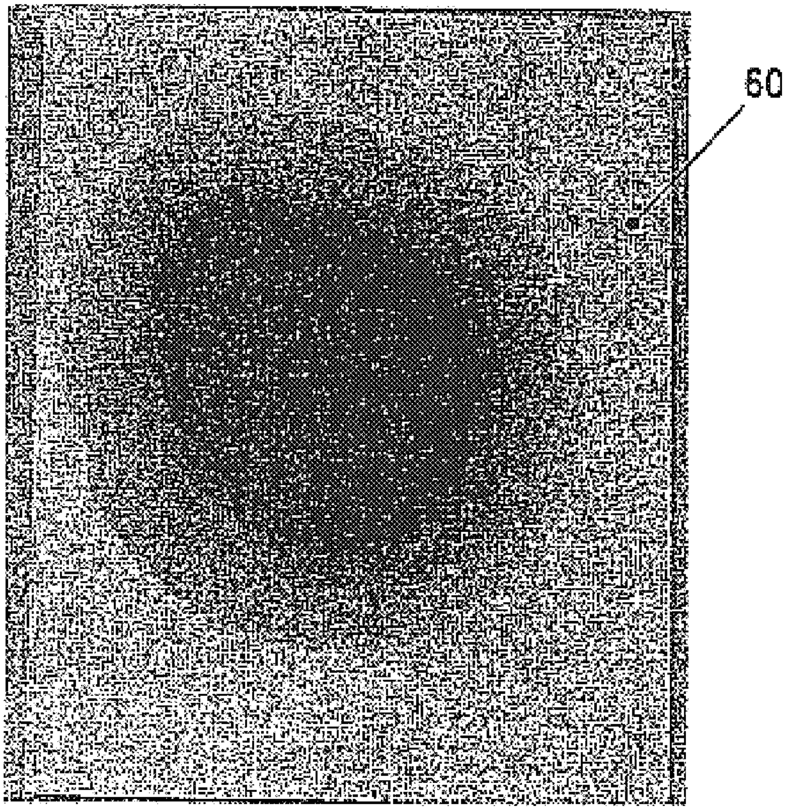
FIG. 7 is a photograph of a non-composite non-woven needlefelt of high density/fine denier useable as an ink jet absorber device.

For comparison purposes, a non-composite non-woven needlefelt 60 with high density/fine denier was produced. This was of a polyester staple fiber blend of 75 percent 1.5 denier and 25 percent 2.25 denier. The same test was performed as discussed above. FIG. 7 is a picture of the non-composite non-woven needlefelt 60 of high density/fine denier and showing the ink dispersion pattern resulting 10 seconds after application of 25 ml of ink to the surface of the material 60. In a manner similar to that discussed above, a piece of kraft paper was placed against a top surface of the material 60 at 10 seconds after ink dispersion. It was again held in place by a 2175 gm weight for 10 seconds. The resultant ink impression 64 is very clearly visible in FIG. 8.

Example #2

Figure 9:
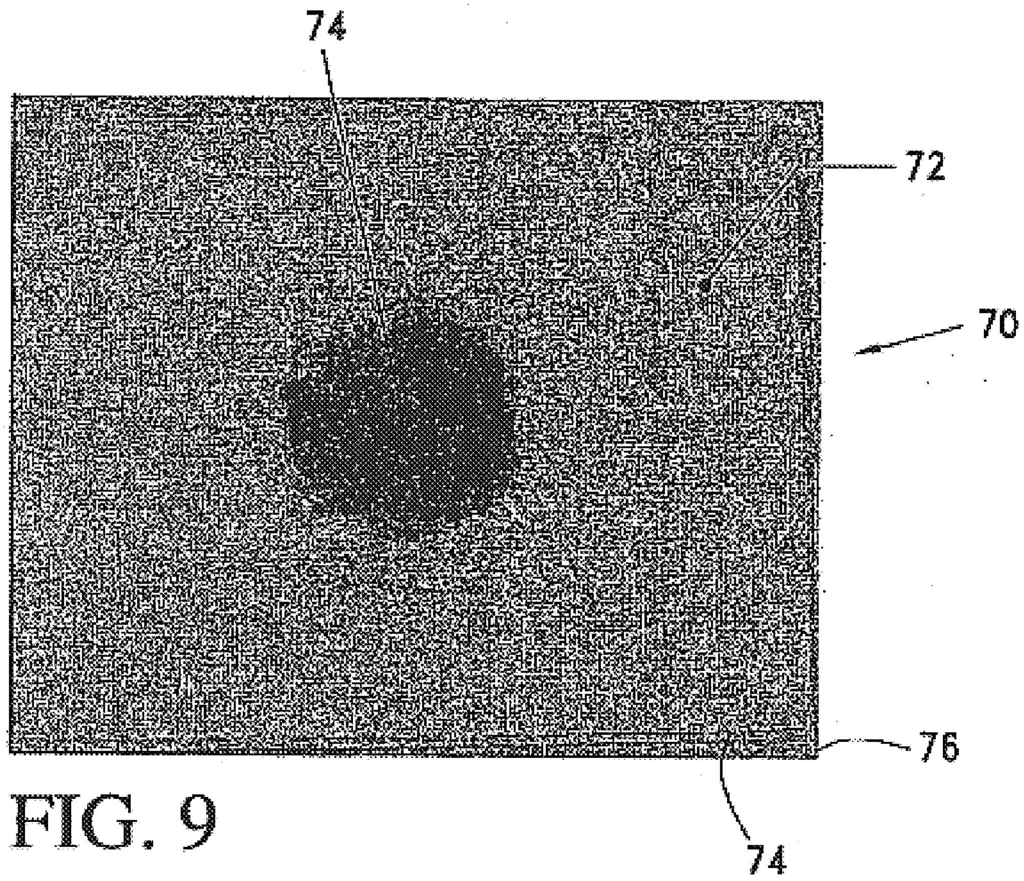
FIG. 9 is a photograph of a second preferred embodiment of a composite non-woven needlefelt with a plurality of layers for use as an ink jet absorber in accordance with the present invention.

A composite non-woven needlefelt 70, as depicted in FIG. 9, was produced with three distinct layers 72, 74, and 76 for use as an ink jet absorber in an ink jet printer application. The top layer 72 consisted of white colored, polyester staple fiber 100-percent 15.0 generally coarse denier fibers having a low density. The second, intermediate layer 74 consisted of white colored, polyester staple fiber blend of 75-percent 6.0 denier fibers and 25-percent 15.0 denier resulting in an intermediate denier and an intermediate density. The bottom layer consisted of a white colored, polyester staple fiber blend of 75-percent 2.25 denier fibers and 25-percent 6.0 denier resulting in a generally fine denier having a relatively high density. The overall felt density of the composite was 0.17 grams per cubic centimeters. Overall nominal thickness of this composite non-woven needlefelt was 11.2 mm. This second example 70 of a composite non-woven needlefelt thus had three layers, a first or top layer 72 of lowest density/coarsest denier; an intermediate layer 74 of intermediate density/intermediate denier; and a bottom layer 76 of high density/fine denier. The second example of a composite non-woven needlefelt 70 was then cut to a rectangular shape of 203 mm×254 mm. A quantity of 50 ml of ink was dispersed into this second example composite non-woven needlefelt 70. Ink was allowed to disperse in the composite non-woven needlefelt 70 for 60 seconds. FIG. 9 shows the ink dispersal pattern 74 for this second example composite non-woven needlefelt 70 after ink dispersion.

Figure 10:
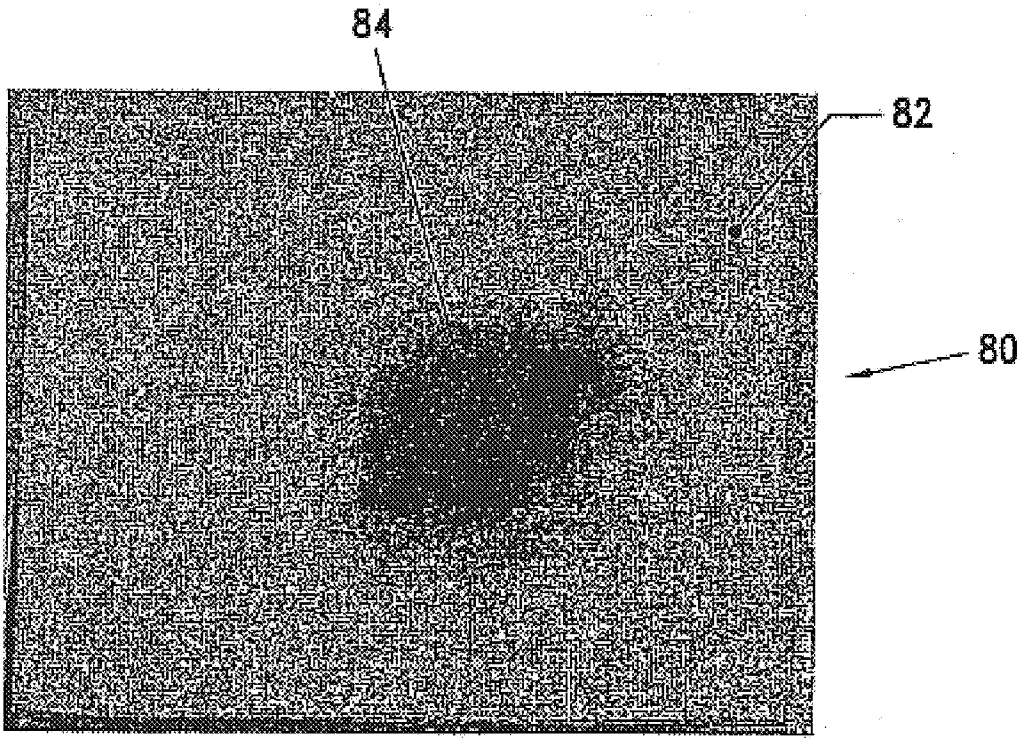
FIG. 10 is a photograph of a non-composite non-woven needlefelt of low density/coarse denier with a singular layer useable as an ink jet absorber.

Again, as with Example #1, a first non-composite non-woven needlefelt with low density/coarse denier was produced. This consisted of a polyester staple fiber 82 of 100 percent 15 denier. It was thus equivalent to the top layer of Example #2. The overall felt density was 0.110 grams per cubic centimeters. Overall nominal thickness of this non-composite non-woven needlefelt was 11.0 mm. The same test was performed, as described above and the resultant ink dispersal pattern 84 is shown in FIG. 10 after ink dispersion.

Figure 11:
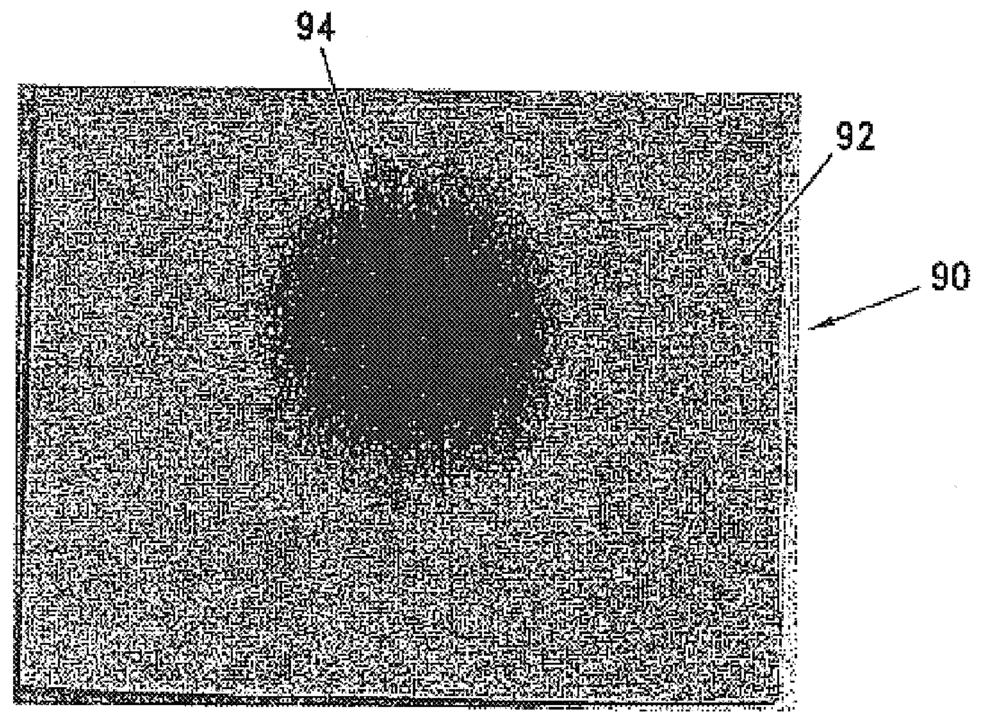
FIG. 11 is a photograph of a non-composite non-woven needlefelt of high density/fine denier with a singular layer useable as an ink jet absorber.

A second non-composite non-woven needlefelt of high density/fine denier 90 was produced and consisted of a white colored, polyester staple fiber blend 92 of 75-percent 2.25 denier fibers and 25-percent 6.0 denier, thus having a structure equivalent to the bottom layer 76 of Example #2. The overall felt density was 0.140 grams per cubic centimeters. Overall nominal thickness of this non-composite non-woven needlefelt was 11.5 mm. The same test was performed as described above and the resultant ink dispersal pattern 94 is shown in FIG. 11 after ink dispersion.

RESULTS

Example #1

The ink impression 58 displayed in kraft paper 56 in FIG. 6 is very minimal at the time stage tested. The ink that was dispersed in the first example of a composite non-woven felt 50, in accordance with the present invention was drawn away from a top surface of top layer 52 of the composite non-woven needlefelt 50 and was received and held in the body of the second layer 54 as has been disclosed previously in connection with the present invention.

Figure 8:
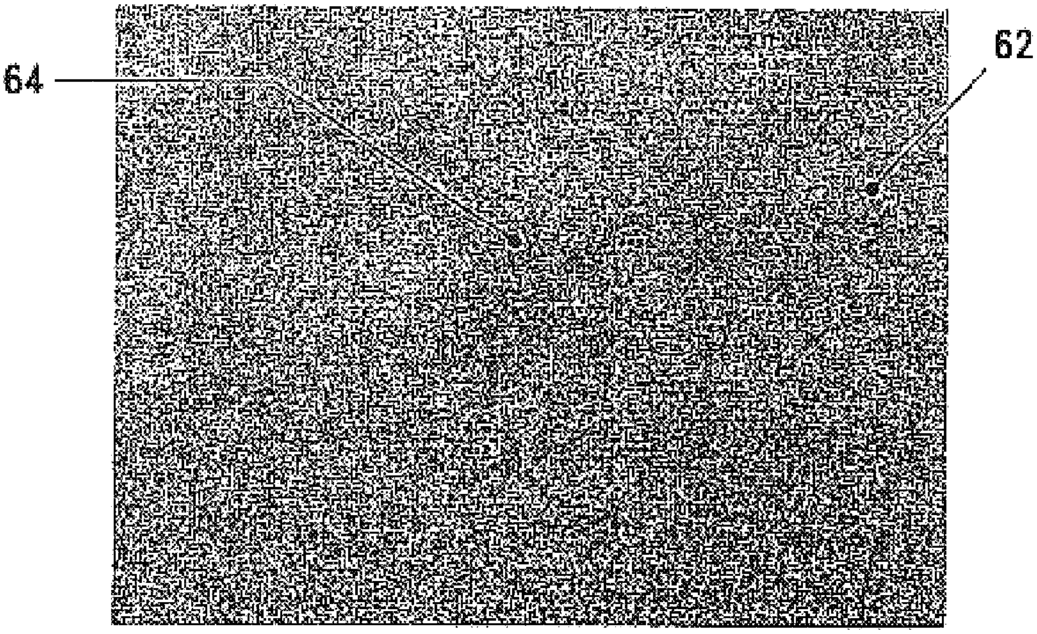
FIG. 8 is a photograph of an ink impression taken from the top surface of the non-composite non-woven needlefelt depicted in FIG. 7.

The ink impression 64 shown in kraft paper 62 in FIG. 8 is substantial at the time stage tested. The ink that was dispersed in the non-composite non-woven felt 60 did not quickly draw away from top surface and thus the potential for waste ink accumulation at the surface is high.

Example #2

The ink distributions 74, 84 and 94 in FIGS. 9, 10, and 11 show the ink entry point and ink dispersion over the time stage tested. The ink that was dispersed in the composite non-woven felt 70 was quickly drawn away from the top surface of top layer 72 of the composite non-woven needlefelt 70 and was received in the body of the bottom layer 76 in a uniform and efficient manner in accordance with the present invention. The diameter of the ink distribution 74 in FIG. 9 equals 70 mm. It is to be noted that FIGS. 9, 10 and 11 all are of the upper or top surface of their respective composite or non-composite needlefelts. These thus all show the entry pattern made in each needlefelt by the volume of ink applied to each.

Figure 12:
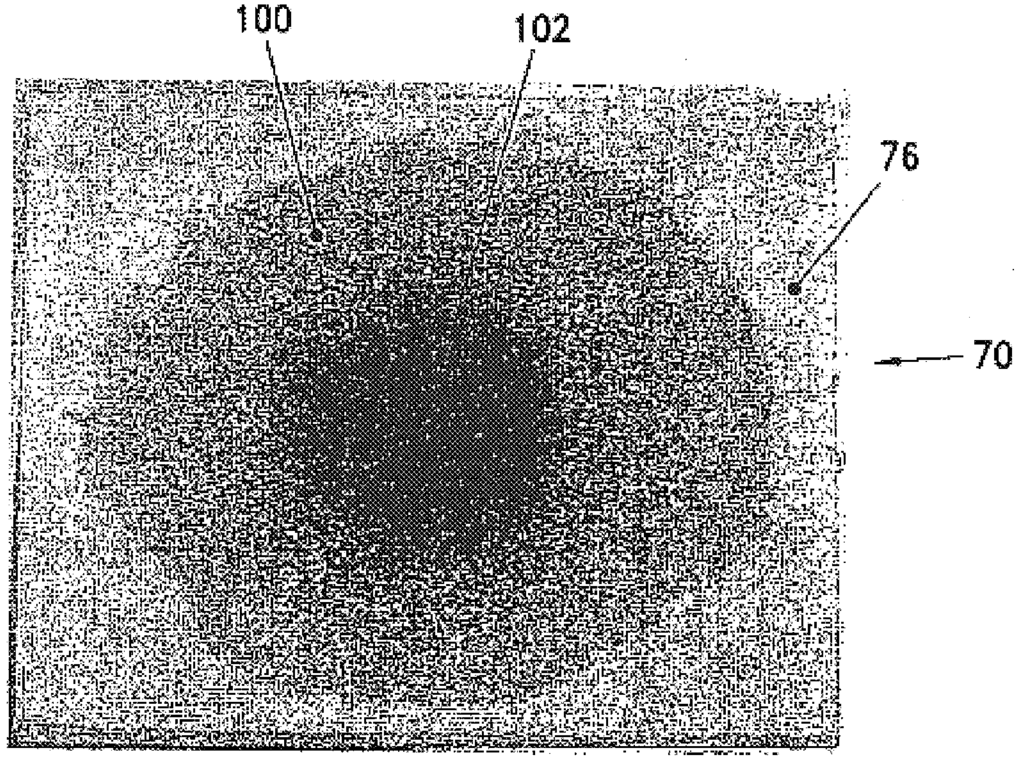
FIG. 12 is a photograph of the bottom face of a composite non-woven needlefelt with a plurality of layers used as an ink jet absorber in accordance with the present invention.

Turning now to FIG. 12 there is shown a bottom view of the three layer composite non-woven needlefelt 70 of FIG. 7. The bottom surface of the lowermost layer 76 of the three layer composite non-woven needlefelt 70 shows an ink distribution pattern 100 of 250 mm. The central darker area 102 in FIG. 12 is sized more with the size of the ink distribution area 74 in FIG. 9. A comparison of the two is visual evidence of the dispersion of the ink that is accomplished by a composite non-woven needlefelt, such as the needlefelt, generally at 70, in accordance with the present invention. As the ink passes from the first or top layer 72 to the bottom, or lower layer 76 of the composite non-woven needlefelt 70, it spreads or disperses horizontally, particularly in the lower layer 76. This accomplishes a greater use of the total absorptive capabilities of the ink absorber in accordance with the present invention.

Figure 13:
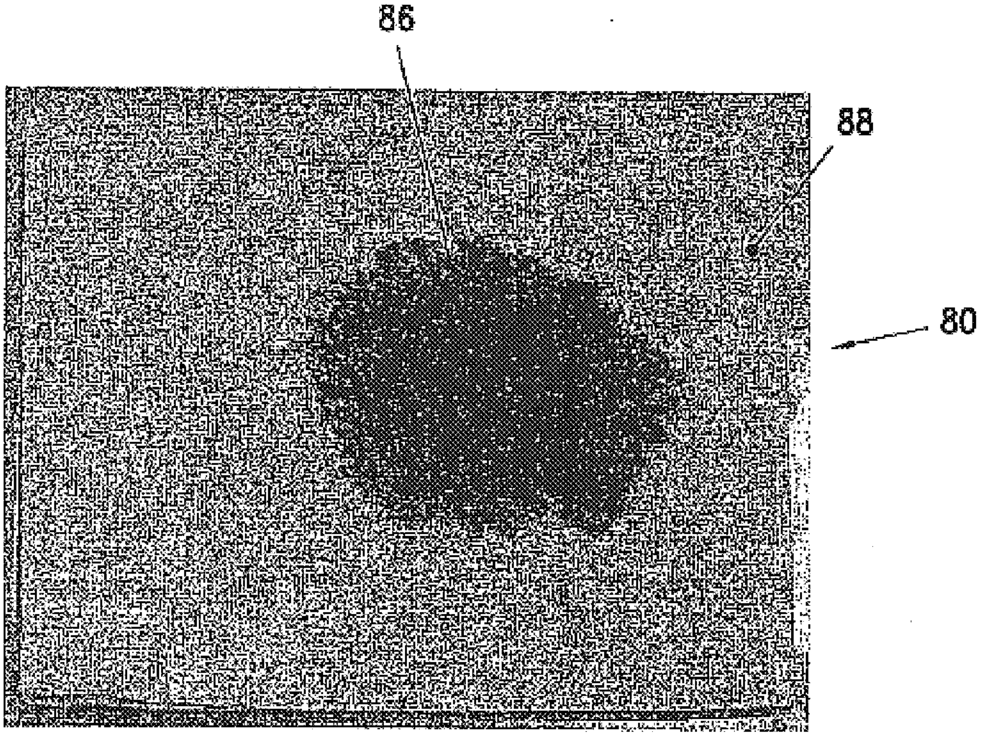
FIG. 13 is a photograph of the bottom face of the non-composite non-woven needlefelt of low density/coarse denier with a singular layer in accordance with FIG. 10 and showing the device after use as an ink jet absorber device.
Figure 14:
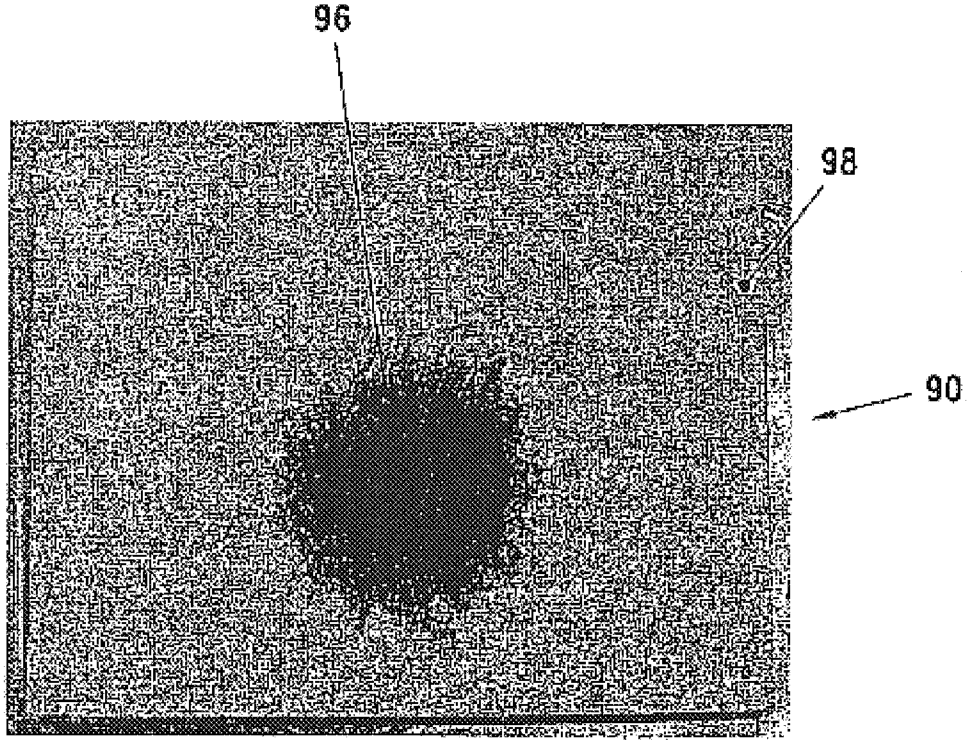
FIG. 14 is a photograph of the bottom face of a non-composite non-woven needlefelt of high density/fine denier with a singular layer in accordance with FIG. 11 and showing the device after use as an ink jet absorber device.

A comparison of the ink dispersal pattern for the second example of a composite non-woven needlefelt 70 depicted in FIG. 9, in accordance with the present invention with the ink dispersal patterns of the two non-composite needlefelts 80 and 90, of FIGS. 10 and 11, respectively is further evidence of the effectiveness of the composite non-woven needlefelt ink absorbers of the present invention. Whereas FIGS. 10 and 11 are top views of the ink dispersal patterns in the two non-composite non-woven needlefelts 80 and 90, FIGS. 13 and 14 are the ink dispersal patterns visible on the bottom surfaces of the non-composite non-woven needlefelts 80 and 90, respectively. In FIG. 13, the bottom ink dispersal pattern is indicated at 86, in FIG. 14, it is indicated at 96.

The ink that was dispersed in the non-composite non-woven felt 80 was quickly drawn away from top surface the non-composite non-woven needlefelt 80 and resides centrally within the body of the non-composite non-woven needlefelt 80, as seen in FIG. 10, and as discussed above. The ink distribution 86 depicted in FIG. 13, viewed from the bottom surface 88 of non-composite non-woven needlefelt 80, shows the ink distribution 88 is slightly larger relative to the top surface the non-composite non-woven needlefelt 80, as seen in FIG. 10. The diameter of the top ink distribution 84 in FIG. 10 equals 114 mm. The diameter of the bottom ink distribution 86 in FIG. 13 equals 130 millimeters.

The ink that was dispersed in the non-composite non-woven felt 90 was absorbed by the non-composite non-woven needlefelt 90 and resides closer to the top surface of the non-composite non-woven needlefelt 90. The ink distribution 96 in FIG. 14, viewed from the bottom surface 98 of non-composite non-woven needlefelt 90, shows the ink distribution 96 is concentrated towards the bottom surface 98 of the non-composite non-woven needlefelt 90. The diameter of the top ink distribution 94 in FIG. 11 equals 96 mm. The diameter of the bottom ink distribution 96 in FIG. 14 equals 87 millimeters. This is clear evidence that the functioning of the composite non-woven needlefelt 70 in its ability to absorb waste ink and to both move it away from the top surface 72 of the ink absorber 70 and to distribute or disperse the ink widely in the bottom layer 76 is greater than would be expected solely by viewing the behavior of the non-composite needlefelts 80 and 90 which make up the respective upper and lower layers of the composite non-woven needlefelt 70 of the second example of the present invention. While the two non-composite non-woven needlefelts 80 and 90 provide almost none or no dispersal by themselves, where they are combined, as described in Example #1 or with an intermediate layer, as described in Example #2, the resultant ink absorber performs far better than would be expected.

Figure 15:
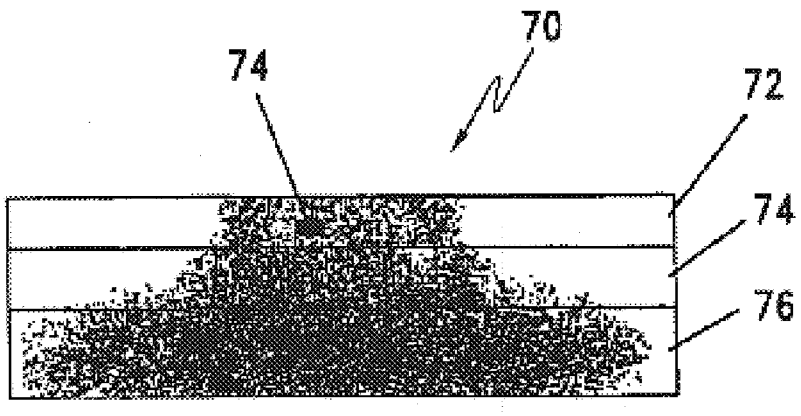
FIG. 15 is a schematic cross-sectional view of ink distribution in the second preferred embodiment of the composite non-woven needlefelt with a plurality of layers for use as an ink jet absorber in accordance with the present invention.
Figure 16:
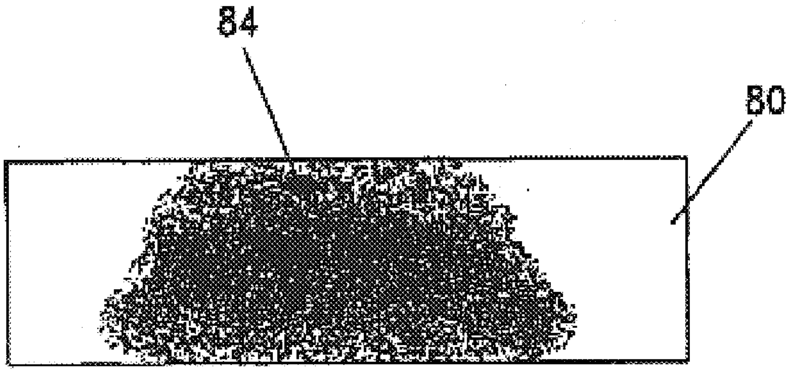
FIG. 16 is a schematic cross-sectional view of ink distribution in a non-composite non-woven needlefelt of low density/coarse denier with a singular layer used as an ink jet absorber device.
Figure 17:
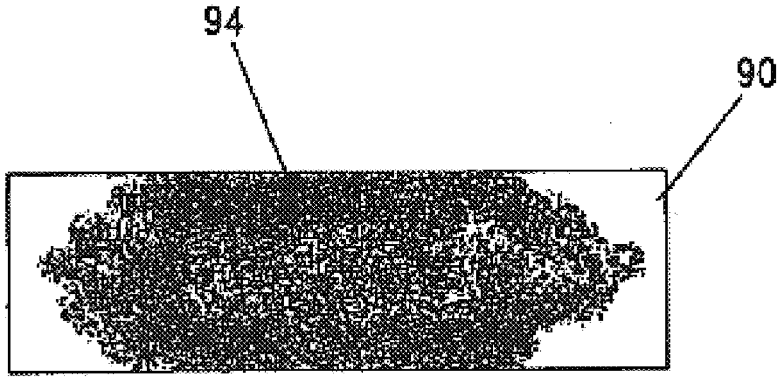
FIG. 17 is a schematic cross-sectional view of ink distribution in a non-composite non-woven needlefelt of high density/fine denier with a singular layer useable as an ink jet absorber device.

The greater than expected absorption and dispersal of waste ink by the composite non-woven needlefelt 70 of Example #2 is further demonstrated by now referring to FIGS. 15, 16 and 17. FIG. 15 is a cross-sectional view of the ink distribution 74 of composite non-woven needlefelt 70 with a plurality of layers for use as an ink jet absorber in accordance with the present invention and structured in accordance with previously discussed Example #2. The ink that was dispersed in the composite non-woven needlefelt felt 70 was quickly drawn away from the top surface of top layer 72 of the composite non-woven needlefelt 70 through the middle layer 74 and resides in the body of the bottom layer 76. This ink distribution 74 is shown in FIG. 15 and provides a uniform and efficient ink dispersal in accordance with the present invention.

FIG. 16 is a cross-sectional view of ink distribution 84 of the non-composite non-woven needlefelt 80 of low density/coarse denier of a singular layer and being used as an ink jet absorber. The ink that was dispersed in the singular layer 80 was drawn away from the top surface of the non-composite non-woven needlefelt 80 and resides centrally within the body of the singular layer 80.

FIG. 17 is a cross-sectional view of ink distribution 94 of the non-composite non-woven needlefelt 90 of high density/fine denier of a singular layer useable as an ink jet absorber. Again, the ink that was dispersed in the non-composite non-woven felt 90 was absorbed by the singular layer and resides closer to the top and bottom surfaces of the singular layer. FIGS. 15, 16 and 17 thus provide further evidence of the beneficial ink absorption and dispersal or dispersion capabilities provided by the composite non-woven needlefelt ink absorber in accordance with the present invention. Not only does the composite non-woven needlefelt ink absorber provide greater than expected absorptive capabilities, it also provides greater than expected distributive or dispersive characteristics. The result is an ink absorber which is particularly useful in an ink jet printer and which ensures that the full ink absorptive capabilities of the ink absorber will be utilized. It also assures that there will not be any build-up of dried ink on the upper surface of the ink absorber thus preventing possible nozzle contamination and paper soiling.

While preferred embodiments of a composite non-woven needlefelt ink absorber adapted for use with an ink jet printer, in accordance with the present invention, have been set forth fully and completely hereinabove, it will be apparent to one of skill in the art that a number of changes in, for example the overall sizes of the ink absorber, the particular structure of the ink jet printer and the like can be made without departing from the true spirit and scope of the present invention which is accordingly to be limited only by the following claims.

What is claimed is:

1. An ink absorber adapted for use with an ink jet printer, said ink absorber comprising:

a first, retention layer of a non-woven material having a first density, a first surface area per unit volume and a first effective denier; and a second, dispersal layer of a non-woven material having a second density a second surface area per unit volume and a second effective denier, said first, retention layer being arranged in said ink absorber to contact ink received in said ink absorber before said second, dispersal layer, said first density being less than said second density, said second surface area per unit volume being greater than said first surface area per unit volume, said first and second layers being in physical contact.

2. The ink absorber of claim 1 further wherein said first denier is more coarse than said second denier.

3. The ink absorber of claim 1 wherein said first non-woven material is a polyester staple fiber.

4. The ink absorber of claim 3 wherein said second non-woven material is a polyester staple fiber.

5. The ink absorber of claim 1 wherein said first, retention layer has a first permeability and further wherein said second, dispersal layer has a second permeability, said first permeability being greater than said second permeability.

6. The ink absorber of claim 1 further including a third layer of a non-woven material, said third layer having a third density and a third effective denier, said third layer being interposed between said first and second layers and in physical contact with both.

7. The ink absorber of claim 6 wherein said third density is intermediate said first and second densities.

8. The ink absorber of claim 7 wherein said third denier is intermediate said first and second deniers.

9. The ink absorber of claim 6 wherein said third non-woven material is a polyester staple fiber.

10. The ink absorber of claim 1 wherein said first, retention layer of non-woven material has a high vertical permeability.

11. The ink absorber of claim 1 wherein said second, dispersal layer of non-woven material has a high horizontal capillary force.

12. The ink absorber of claim 1 wherein said first, retention layer is a needlefelt.

13. The ink absorber of claim 1 wherein said second, dispersal layer is a needlefelt.

14. The ink absorber of claim 12 wherein said second, dispersal layer is a needlefelt.

15. The ink absorber of claim 1 wherein said ink absorber is a needlefelt.

16. An ink absorber adapted for use with an ink jet printer, said ink absorber comprising:

a first, retention layer of a non-woven material having a first density, a first permeability and a first effective denier; and a second, dispersal layer of a non-woven material having a second density, a second permeability and a second effective denier, said first, retention layer being arranged in said ink absorber to contact ink received in said ink absorber before said second, dispersal layer, said first density being less than said second density, said first permeability being greater than said second permeability, said first and second layers being in physical contact.

17. The ink absorber of claim 16 further wherein said first denier is more coarse than said second denier.

18. The ink absorber of claim 16 wherein said first non-woven material is a polyester staple fiber.

19. The ink absorber of claim 18 wherein said second non-woven material is a polyester staple fiber.

20. The ink absorber of claim 16 wherein said first, retention layer has a first surface area per unit volume and further wherein said second, dispersal layer has a second surface area per unit volume, said second surface area per unit volume being greater than said first surface area per unit volume.

21. The ink absorber of claim 16 further including a third layer of a non-woven material, said third layer having a third density and a third effective denier, said third layer being interposed between said first and second layers and in physical contact with both.

22. The ink absorber of claim 21 wherein said third density is intermediate said first and second densities.

23. The ink absorber of claim 22 wherein said third denier is intermediate said first and second deniers.

24. The ink absorber of claim 21 said third non-woven material is a polyester staple fiber.

25. The ink absorber of claim 16 wherein said first, retention layer of non-woven material has high vertical permeability.

26. The ink absorber of claim 16 wherein said second, dispersal layer of non-woven material has a high horizontal capillary force.

27. The ink absorber of claim 16 wherein said first, retention layer is a needlefelt.

28. The ink absorber of claim 16 wherein said second, dispersal layer is a needlefelt.

29. The ink absorber of claim 27 wherein said second, dispersal layer is a needlefelt.

30. The ink absorber of claim 16 wherein said ink absorber is a needlefelt.

* * * * *